United States Patent
Okamura et al.

(10) Patent No.: US 7,417,393 B2
(45) Date of Patent: Aug. 26, 2008

(54) LOAD DRIVER CAPABLE OF SUPPRESSING OVERCURRENT

(75) Inventors: Masaki Okamura, Toyota (JP); Takashi Yamashita, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 216 days.

(21) Appl. No.: 10/560,088

(22) PCT Filed: Jul. 12, 2004

(86) PCT No.: PCT/JP2004/010249

§ 371 (c)(1),
(2), (4) Date: Dec. 9, 2005

(87) PCT Pub. No.: WO2005/013473

PCT Pub. Date: Feb. 10, 2005

(65) Prior Publication Data

US 2006/0119297 A1    Jun. 8, 2006

(30) Foreign Application Priority Data

Jul. 31, 2003    (JP) .............................. 2003-204762

(51) Int. Cl.
H02K 17/32    (2006.01)

(52) U.S. Cl. .................. 318/434; 318/432; 318/433; 318/567; 318/801

(58) Field of Classification Search ............... 318/434, 318/432, 433, 567, 569, 599, 798, 800, 801, 318/802, 811, 812, 139, 803; 363/88, 87, 363/51, 54

See application file for complete search history.

(56) References Cited

U.S. PATENT DOCUMENTS

| | | | |
|---|---|---|---|
| 5,373,195 A | 12/1994 | De Doncker et al. | |
| 5,483,435 A * | 1/1996 | Uchino | 363/81 |
| 5,883,484 A | 3/1999 | Akao | |
| 6,060,859 A | 5/2000 | Jonokuchi | |
| 2003/0155878 A1* | 8/2003 | Murai | 318/268 |
| 2004/0150359 A1* | 8/2004 | Yaguchi et al. | 318/254 |
| 2004/0165868 A1 | 8/2004 | Sato et al. | |

FOREIGN PATENT DOCUMENTS

| | | |
|---|---|---|
| CN | 1114476 A | 1/1996 |
| DE | 40 13 506 A1 | 10/1991 |
| JP | A-59-181973 | 10/1984 |
| JP | A-06-276609 | 9/1994 |
| JP | A-10-066383 | 3/1998 |
| JP | A-2000-333465 | 11/2000 |
| JP | A-2000-350487 | 12/2000 |

* cited by examiner

*Primary Examiner*—Karen Masih
(74) *Attorney, Agent, or Firm*—Oliff & Berridge, PLC

(57) ABSTRACT

A control device determines whether a motor generator is controlled in a PWM control mode, an overmodulation control mode or a rectangular-wave control mode. If a command to perform a boosting operation by a voltage step-up converter is issued while the motor generator is controlled in the rectangular-wave control mode, the control device controls an inverter to drive the motor generator by switching the control mode to the overmodulation or PWM control mode. Further, the control device controls the inverter to drive the motor generator by suppressing increase of a torque command value.

6 Claims, 8 Drawing Sheets

F I G. 5
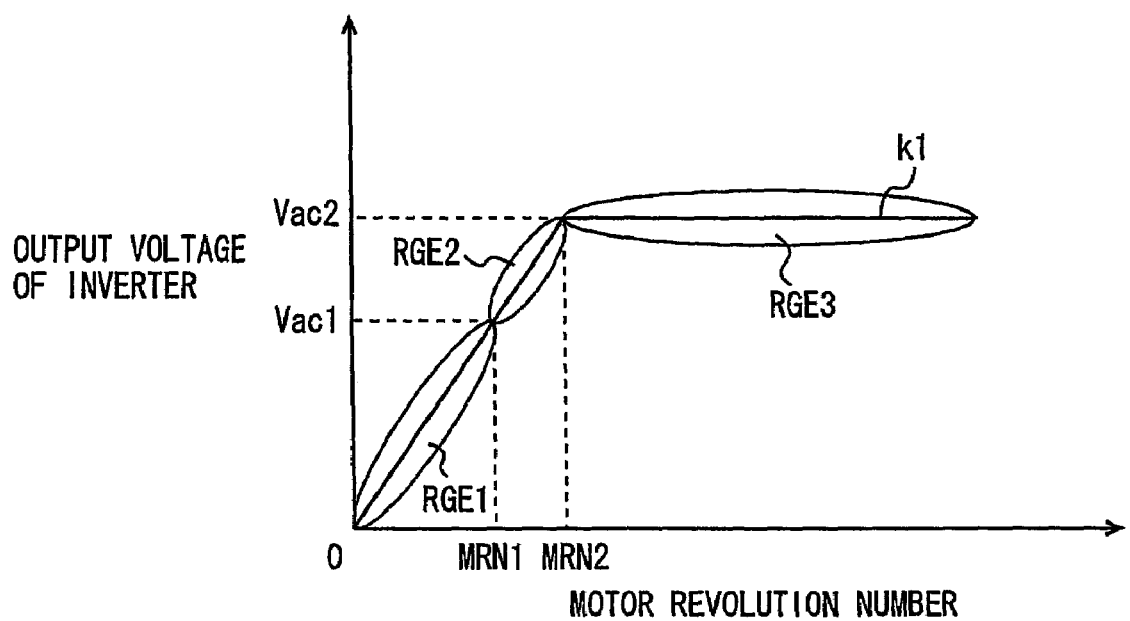

LOAD DRIVER CAPABLE OF SUPPRESSING OVERCURRENT

TECHNICAL FIELD

The present invention relates to a load driver and particularly to a load driver capable of suppressing overcurrent.

BACKGROUND ART

Hybrid vehicles and electric vehicles have recently been of great interest as environment-friendly vehicles. The hybrid vehicles are now partially commercialized.

A hybrid vehicle has, as its motive power sources, a DC (direct current) power supply, an inverter and a motor driven by the inverter in addition to a conventional engine. More specifically, the engine is driven to secure the motive power source and a DC voltage from the DC power supply is converted by the inverter into an AC (alternating current) voltage to be used for rotating the motor and thereby securing the motive power source as well. An electric vehicle refers to a vehicle that has, as its motive power sources, a DC power supply, an inverter and a motor driven by the inverter.

Regarding the hybrid and electric vehicles, it has been proposed to boost a DC voltage from the power supply with a voltage step-up converter and invert the boosted DC voltage into an AC voltage for driving the motor.

Japanese Patent Laying-Open No. 2000-333465 discloses a system having a converter variably changing an input voltage to an inverter which drives a motor. According to the input voltage to the inverter and a voltage required for controlling the motor, the control mode of the motor is switched from a pulse-width-modulation control mode (PWM control mode) to a rectangular-wave control mode.

If the motor is driven in the rectangular-wave control mode while a DC voltage from a power supply is boosted and then supplied to the inverter, however, the amount of current taken from the power supply increases, resulting in a problem of generation of overcurrent.

DISCLOSURE OF THE INVENTION

An object of the present invention is thus to provide a load driver capable of suppressing overcurrent.

According to the present invention, a load driver includes an inverter, a voltage converter and a control device. The inverter drives a load. The voltage converter executes voltage conversion between a power supply and the inverter. The control device controls the inverter to drive the load by changing control mode of the load, upon receiving a command to perform a boosting operation by the voltage converter when the control mode of the load is a rectangular-wave control mode.

Preferably, the control device controls the inverter to drive the load by changing the control mode to a pulse-width-modulation control mode.

Preferably, the control device controls the inverter to drive the load by further suppressing increase of a torque command value.

With the load driver of the present invention, when the command to do the boosting operation by the voltage converter is issued while the control mode of the load is the rectangular-wave control mode, the control device controls the inverter to drive the load by changing the control mode to an overmodulation control mode or the PWM control mode except for the rectangular-wave control mode.

According to the present invention, the amount of current taken from the power supply can be reduced and overcurrent flowing in the load driver can be suppressed.

Further, according to the present invention, a load driver includes an inverter, a voltage converter and a control device. The inverter drives a load. The voltage converter executes voltage conversion between a power supply and the inverter. The control device controls the inverter to drive the load by suppressing increase of a torque command value, upon receiving a command to perform a boosting operation by the voltage converter when control mode of the load is a rectangular-wave control mode.

With the load driver of the present invention, when the command to do the boosting operation by the voltage converter is issued while the control mode of the load is the rectangular-wave control mode, the control device controls the inverter to drive the load by suppressing increase of the torque command value.

According to the present invention, the amount of current taken from the power supply can be reduced and overcurrent flowing in the load driver can be suppressed.

Moreover, according to the present invention, a load driver includes an inverter, a voltage converter and a control device. The inverter drives a load. The voltage converter executes voltage conversion between a power supply and the inverter. The control device controls the inverter to drive the load in a control mode except for the rectangular-wave control mode when the voltage converter performs a boosting operation.

With the load driver of the present invention, the control device inhibits the load from being driven in the rectangular-wave control mode when the voltage converter is performing the boosting operation.

According to the present invention, even in a case where there arises a delay in the period from the issuance of the command to do the boosting operation to the actual start of the boosting operation, the amount of current taken from the power supply can be reduced and overcurrent flowing in the load driver can be suppressed.

BRIEF DESCRIPTION OF THE DRAWINGS

FIG. 5 shows a relation between an output voltage of the inverter and a motor revolution number.

BEST MODES FOR CARRYING OUT THE INVENTION

Figure 1:
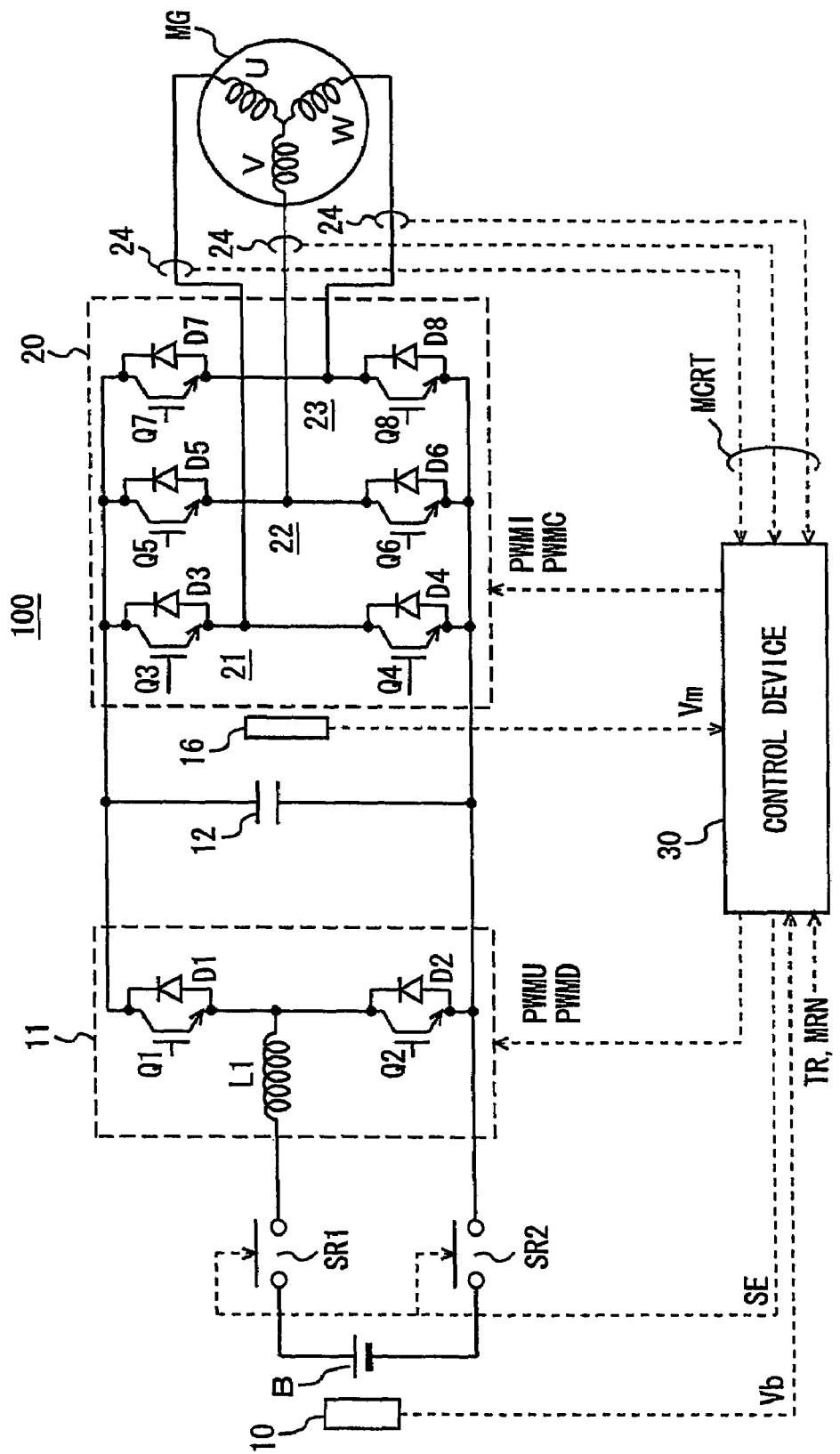
FIG. 1 is a schematic block diagram of a load driver according to an embodiment of the present invention.

An embodiment of the present invention is hereinafter described in detail with reference to the drawings. Like components in the drawings are denoted by like reference characters and the description thereof is not repeated here.

FIG. 1 is a schematic block diagram of a load driver according to an embodiment of the present invention. Referring to FIG. 1, load driver 100 of this embodiment includes a DC power supply B, system relays SR1 and SR2, voltage sensors 10 and 16, a voltage step-up converter 11, a capacitor 12, an inverter 20, electric-current sensors 24, and a control device 30.

Voltage step-up converter 11 includes a reactor L1, NPN transistors Q1 and Q2 and diodes D1 and D2. Reactor L1 has one end connected to a power supply line of DC power supply B and the other end connected to an intermediate point between NPN transistors Q1 and Q2, namely between the emitter of NPN transistor Q1 and the collector of NPN transistor Q2.

NPN transistors Q1 and Q2 are connected in series between a power supply line and a ground line of inverter 20. NPN transistor Q1 has its collector connected to the power supply line and its emitter connected to the collector of NPN transistor Q2. NPN transistor Q2 has its emitter connected to the ground line.

Further, between respective collectors and emitters of NPN transistors Q1 and Q2, diodes D1 and D2 flowing electric current from respective emitters to respective collectors are provided.

Inverter 20 is comprised of a U phase arm 21, a V phase arm 22 and a W phase arm 23. U phase arm 21, V phase arm 22 and W phase arm 23 are provided in parallel between the power supply line and the ground line.

U phase arm 21 is comprised of series-connected NPN transistors Q3 and Q4, V phase arm 22 is comprised of series-connected NPN transistors Q5 and Q6 and W phase arm 23 is comprised of series-connected NPN transistors Q7 and Q8. Between respective collectors and emitters of NPN transistors Q3-Q8, diodes D3-D8 flowing current from respective emitters to respective collectors are connected.

An intermediate point of each phase arm is connected to an end of each phase coil of a motor generator MG. Specifically, motor generator MG is a three-phase permanent-magnet motor configured of three coils of U, V and W phases respectively. One end of the U phase coil, one end of the V phase coil and one end of the W phase coil are connected at the common central junction, while the other end of the U phase coil is connected to an intermediate point between NPN transistors Q3 and Q4, the other end of the V phase coil is connected to an intermediate point between NPN transistors Q5 and Q6 and the other end of the W phase coil is connected to an intermediate point between NPN transistors Q7 and Q8.

DC power supply B is comprised of secondary or rechargeable cell(s), for example, of nickel hydride or lithium ion. DC power supply B provides a DC voltage via system relays SR1 and SR2 to voltage step-up converter 11.

System relays SR1 and SR2 are turned on/off in response to signal SE from control device 30.

Voltage sensor 10 detects DC voltage Vb which is output from DC power supply B to output the detected DC voltage Vb to control device 30.

Based on signal PWMU from control device 30, voltage step-up converter 11 boosts the DC voltage which is output from DC power supply B to supply the boosted DC voltage to capacitor 12. Further, based on signal PWMD from control device 30, voltage step-up converter 11 decreases a DC voltage which is supplied from inverter 20 to provide the decreased DC voltage to DC power supply B.

Capacitor 12 smoothes the DC voltage supplied from voltage step-up converter 11 to provide the smoothed DC voltage to inverter 20.

Voltage sensor 16 detects the terminal-to-terminal voltage of capacitor 12 to output the detected voltage Vm to control device 30.

Based on signal PWMI from control device 30, inverter 20 converts the DC voltage supplied from voltage step-up converter 11 via capacitor 12 into an AC voltage to drive motor generator MG. Further, based on signal PWMC from control device 30, inverter 20 converts an AC voltage generated by motor generator MG into a DC voltage to supply the resultant DC voltage to voltage step-up converter 11 via capacitor 12.

Current sensors 24 detect motor current MCRT flowing through motor generator MG to output the detected motor current MCRT to control device 30.

Control device 30 generates signal PWMU or signal PWMD based on DC voltage Vb from voltage sensor 10, voltage Vm from voltage sensor 16, motor revolution number (number of revolutions of the motor) MRN and torque command value TR from an ECU (Electrical Control Unit) provided outside load driver 100, according to a method hereinlater described, and outputs the generated signal PWMU or PWMD to voltage step-up converter 11.

Further, control device 30 generates signal PWMI or signal PWMC based on voltage Vm from voltage sensor 16, motor current MCRT from current sensors 24 and torque command value TR from the external ECU, according to a method hereinlater described, and outputs the generated signal PWMI or PWMC to inverter 20.

Signal PWMI is a control signal for driving motor generator MG in a powering, namely electric motor mode and signal PWMC is a control signal for driving motor generator MG in a regenerative, namely electric power generator mode.

In generating signal PWMI, control device 30 determines by a method hereinlater described whether the control mode of motor generator MG is a pulse-width-modulation control mode (hereinlater "PWM control mode"), an overmodulation control mode or a rectangular-wave control mode. If control device 30 determines that the control mode of motor generator MG is the rectangular-wave control mode while a command to do a boosting operation by voltage step-up converter 11 is issued, control device 30 controls inverter 20 to drive motor generator MG by switching the control mode of motor generator MG to the overmodulation control mode or the PWM control mode.

Signal PWMI is comprised of signal PWMI_P, signal PWMI_M and signal PWMI_K. Signal PWMI_P is a control signal for driving motor generator MG in the PWM control mode, signal PWMI_M is a control signal for driving motor generator MG in the overmodulation control mode and signal PWMI_K is a control signal for driving motor generator MG in the rectangular-wave control mode.

Accordingly, if the command to do the boosting operation by voltage step-up converter 11 is issued while control device 30 outputs signal PWMI_K to inverter 20, control device 30 generates signal PWMI_P or signal PWMI_M and outputs the generated signal to inverter 20.

Further, when voltage step-up converter 11 is performing the boosting operation, control device 30 inhibits motor generator MG from being driven in the rectangular-wave control mode. In other words, when voltage step-up converter 11 is performing the boosting operation, control device 30 outputs signal PWMI_P or signal PWMI_M to inverter 20 to control inverter 20 for driving motor generator MG in the PWM control mode or the overmodulation control mode.

Figure 2:
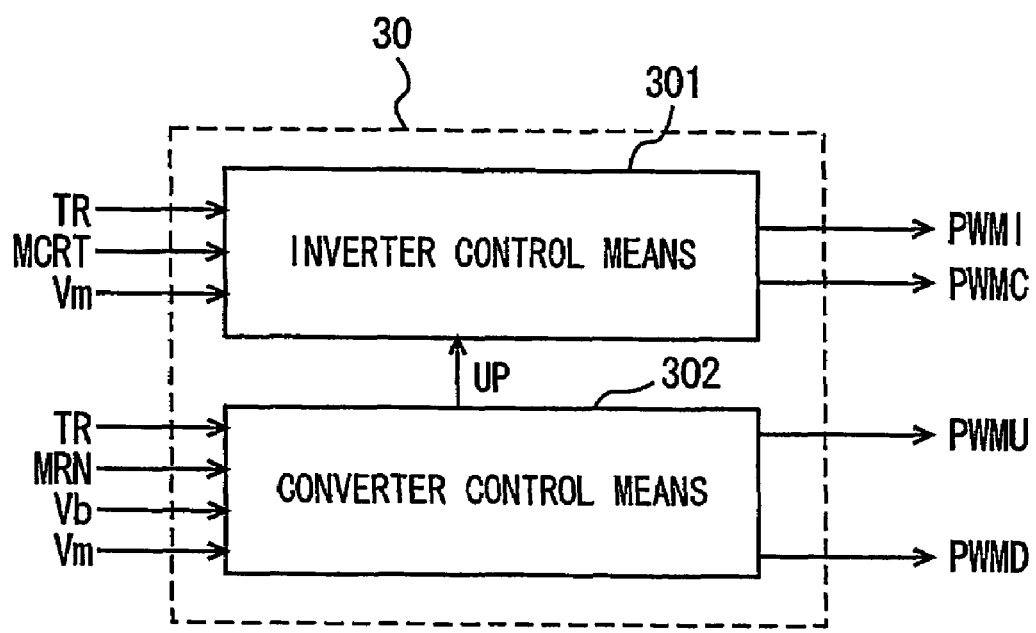
FIG. 2 is a functional block diagram showing functions relevant to control of a voltage step-up converter and an inverter among functions of a control device shown in FIG. 1.

FIG. 2 is a functional block diagram showing functions relevant to control of voltage step-up converter 11 and inverter 20 among functions of control device 30 shown in FIG. 1. Referring to FIG. 2, control device 30 includes inverter control means 301 and converter control means 302. Inverter control means 301 generates, based on torque command value TR, motor current MCRT and voltage Vm (corresponding to "inverter input voltage" to inverter 20, which is hereinafter applied), signal PWMI or signal PWMC according to a method hereinlater described to output the generated signal to NPN transistors Q3-Q8 of inverter 20.

If inverter control means 301 receives signal UP from converter control means 302 and determines that the control mode of motor generator MG is the rectangular-wave control mode, inverter control means 301 generates signal PWMI_P or signal PWMI_M to output the generated signal to NPN transistors Q3-Q8 of inverter 20.

Further, regardless of the control mode of motor generator MG, if inverter control means 301 receives signal UP from converter control means 302, inverter control means 301 generates signal PWMI_P or signal PWMI_M to output the generated signal to NPN transistors Q3-Q8 of inverter 20.

Converter control means 302 determines, based on torque command value TR and motor revolution number MRN, whether or not a command to do a boosting operation by voltage step-up converter 11 is issued.

Then, if converter control means 302 determines that the command to do the boosting operation by voltage step-up converter 11 is issued, converter control means 302 generates signal UP to output the generated signal to inverter control means 301.

Further, based on torque command value TR, motor revolution number MRN, DC voltage Vb and voltage Vm, converter control means 302 generates signal PWMU or signal PWMD according to a method hereinlater described to output the generated signal to NPN transistors Q1 and Q2 of voltage step-up converter 11.

Figure 3:
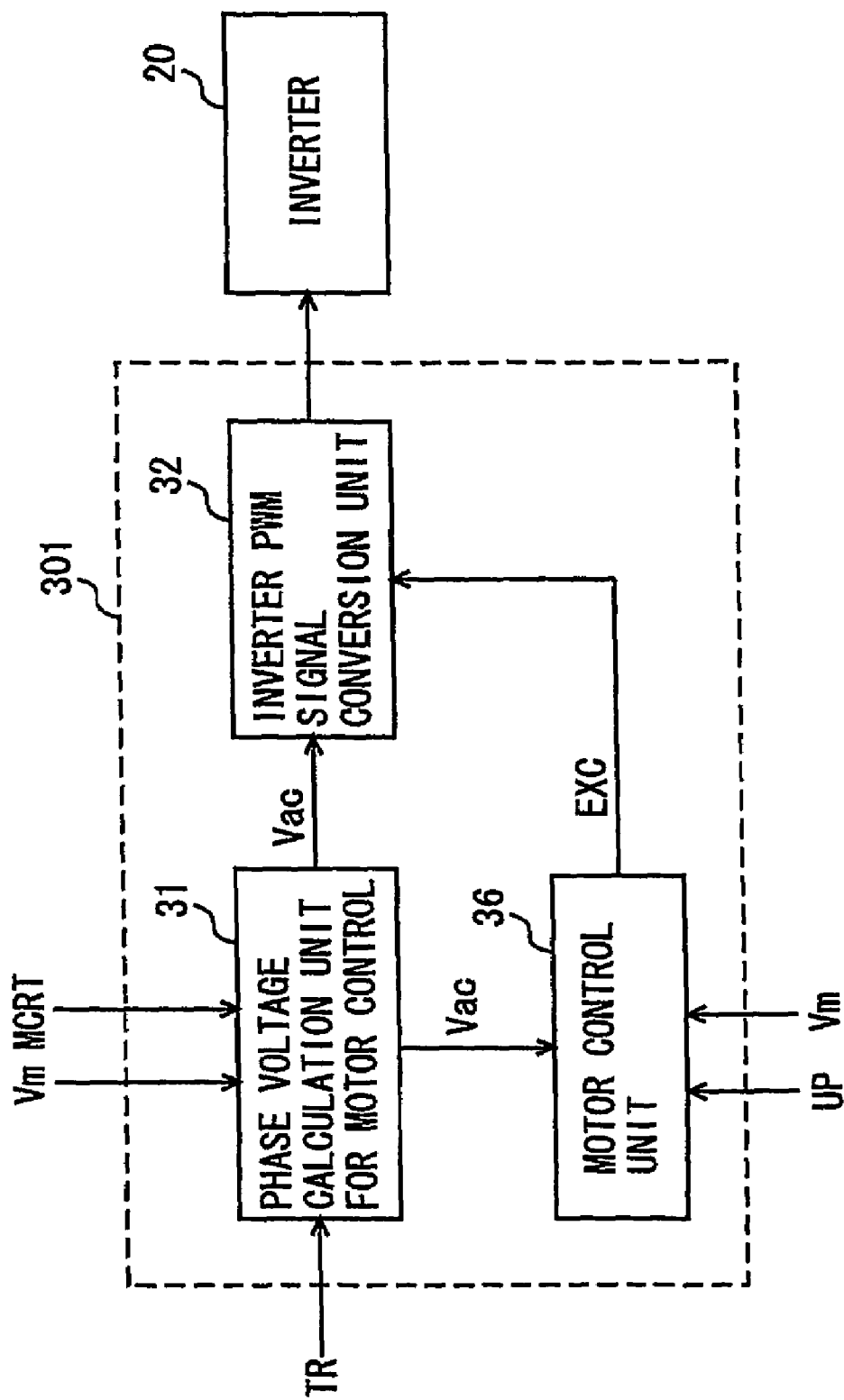
FIG. 3 is a functional block diagram of inverter control means shown in FIG. 2.

FIG. 3 is a functional block diagram of inverter control means 301 shown in FIG. 2. Referring to FIG. 3, inverter control means 301 includes a phase voltage calculation unit for motor control (hereinafter phase voltage calculation unit) 31, an inverter PWM signal conversion unit 32 and a motor control unit 36.

Phase voltage calculation unit 31 receives from voltage sensor 16 inverter input voltage Vm to be input to inverter 20, receives from electric-current sensors 24 motor current MCRT flowing through each phase of motor generator MG, and receives torque command value TR from the external ECU. Based on these input signals, phase voltage calculation unit 31 calculates voltage Vac to be applied to the coil of each phase of motor generator MG to output the resultant voltage Vac to inverter PWM signal conversion unit 32 and motor control unit 36.

Based on the resultant voltage Vac calculated by and provided from phase voltage calculation unit 31, inverter PWM signal conversion unit 32 generates signal PWMI or signal PWMC for actually turning on/off each of NPN transistors Q3-Q8 of inverter 20 to output the generated signal PWMI or PWMC to each of NPN transistors Q3-Q8.

More specifically, inverter PWM signal conversion unit 32 receives signal EXC from motor control unit 36 to generate signal PWMI_P or signal PWMI_M based on the resultant voltage Vac from phase voltage calculation unit 31 and outputs the generated signal to NPN transistors Q3-Q8. If inverter PWM signal conversion unit 32 does not receive signal EXC from motor control unit 36, inverter PWM signal conversion unit 32 generates, based on the voltage Vac calculated by and provided from phase voltage calculation unit 31, one of signal PWMI_P, signal PWMI_M and signal PWMI_K to output the generated signal to NPN transistors Q3-Q8.

Accordingly, switching of NPN transistors Q3-Q8 is controlled to control the current to be flown to each phase of motor generator MG in such a manner that motor generator MG outputs the torque according to the command. In this way, the motor drive current is controlled and the motor torque is output according to torque command value TR.

If the control mode of motor generator MG is the rectangular-wave control mode and voltage step-up converter 11 is performing the boosting operation, NPN transistors Q3-Q8 drive motor generator MG by switching the control mode to the PWM control mode or the overmodulation control mode.

Further, when voltage step-up converter 11 is performing the boosting operation, NPN transistors Q3-Q8 drive motor generator MG in the PWM control mode or the overmodulation mode even if "voltage utilization factor" increases.

Motor control unit 36 receives from phase voltage calculation unit 31 voltage Vac to be applied to motor generator MG and receives voltage Vm from voltage sensor 16. Motor control unit 36 then divides voltage Vac by voltage Vm to calculate voltage utilization factor k.

Based on the calculated voltage utilization factor k, motor control unit 36 determines whether the control mode of motor generator MG is the PWM control mode, the overmodulation control mode or the rectangular-wave control mode.

More specifically, if voltage utilization factor k is 0.61, motor control unit 36 determines that the control mode of motor generator MG is the PWM control mode. If voltage utilization factor k is 0.75, motor control unit 36 determines that the control mode of motor generator MG is the overmodulation control mode. If voltage utilization factor k is 0.78, motor control unit 36 determines that the control mode of motor generator MG is the rectangular-wave control mode.

Accordingly, if motor control unit 36 determines that the control mode of motor generator MG is the rectangular-wave control mode while receiving signal UP from converter control means 302, motor control unit 36 generates signal EXC to output the generated signal to inverter PWM signal conversion unit 32. If motor control unit 36 determines that the control mode of motor generator MG is the PWM control mode or the overmodulation control mode, motor control unit 36 does not generate signal EXC even if it receives signal UP from converter control means 302.

Further, regardless of the control mode of motor generator MG, motor control unit 36 generates, if it receives signal UP from converter control means 302, signal EXC to output the generated signal to inverter PWM signal conversion unit 32.

Whether the operation mode of motor generator MG is the powering (electric motor) mode or the regenerative (electric power generator) mode is determined from the relation between torque command value TR and motor revolution number MRN. It is supposed here that the horizontal or x-axis of a rectangular coordinate system indicates motor revolution number MRN and the vertical or y-axis thereof indicates torque command value TR. Then, if the correlated torque command value TR and motor revolution number MRN is in the first or second quadrant, the operation mode of motor generator MG is the powering mode. If the correlated torque command value TR and motor revolution number MRN is in the third or fourth quadrant, the operation mode of motor generator MG is the regenerative mode.

Accordingly, inverter control means 301 generates, if it receives positive torque command value TR, signal PWMI (comprised of signals PWMI_P, PWMI_M and PWMI_K) for driving motor generator MG as a drive motor to output the generated signal to NPN transistors Q3-Q8 and generates, if it receives negative torque command value TR, signal PWMC for driving motor generator MG in the regenerative mode to output the generated signal to NPN transistors Q3-Q8.

Figure 4:
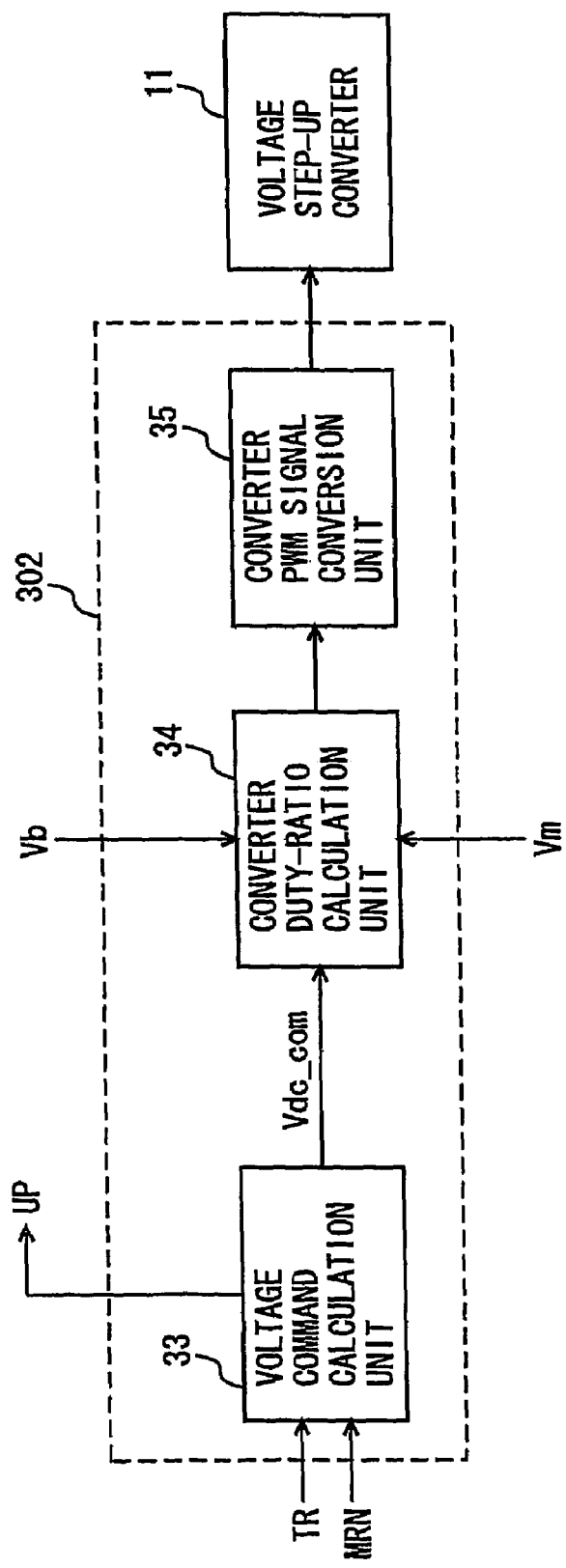
FIG. 4 is a functional block diagram of converter control means shown in FIG. 2.

FIG. 4 is a functional block diagram of converter control means 302 shown in FIG. 2. Referring to FIG. 4, converter control means 302 includes a voltage command calculation unit 33, a converter duty-ratio calculation unit 34 and a converter PWM signal conversion unit 35.

Voltage command calculation unit 33 calculates, based on torque command value TR and motor revolution number MRN from the external ECU, an optimum value (target value) of the inverter input voltage, namely voltage command value Vdc_com of voltage step-up converter 11. Then, voltage command calculation unit 33 determines, based on the calculated voltage command value Vdc_com, whether or not the command to perform the boosting operation by voltage step-up converter 11 is issued.

More specifically, voltage command calculation unit 33 determines whether or not the calculated voltage command value Vdc_com is larger than a voltage command value calculated last time to determine whether or not the command to perform the boosting operation by voltage step-up converter 11 is issued. Then, if voltage command calculation unit 33 determines that the command to perform the boosting operation by voltage step-up converter 11 is issued, voltage command calculation unit 33 generates signal UP to output this signal to inverter control means 301 and output the calculated voltage command value Vdc_com to converter duty-ratio calculation unit 34.

Converter duty-ratio calculation unit 34 calculates, based on voltage command value Vdc_com from voltage command calculation unit 33, DC voltage Vb from voltage sensor 10 and voltage Vm from voltage sensor 16, the duty ratio for setting voltage Vm to voltage command value Vdc_com to output the calculated duty ratio to converter PWM signal conversion unit 35.

Converter PWM signal conversion unit 35 generates, based on the duty ratio from converter duty-ratio calculation unit 34, signal PWMU or signal PWMD for turning on/off NPN transistors Q1 and Q2 of voltage step-up converter 11 and outputs the generated signal PWMU or PWMD to NPN transistors Q1 and Q2 of voltage step-up converter 11.

The on-duty of NPN transistor Q2 which is the lower one in FIG. 1 of voltage step-up converter 11 can be increased to increase electric-power storage of reactor L1, achieving a higher voltage output. In contrast, if the on-duty of the upper NPN transistor Q1 is increased, the voltage on the power supply line decreases. Accordingly, through control of the duty ratio of NPN transistors Q1 and Q2, the voltage on the power supply line can be controlled so that the voltage is set to an arbitrary voltage of at least the output voltage of DC power supply B.

FIG. 5 shows a relation between output voltage Vac of the inverter and the motor revolution number. Referring to FIG. 5, the relation between output voltage Vac of inverter 20 and motor revolution number MRN is represented by curve k1. Output voltage Vac increases in proportion to motor revolution number MRN for the range from 0 to MRN2 of motor revolution number MRN and output voltage Vac is constant for motor revolution number MRN of at least MRN2.

Curve k1 is divided into region RGE1 for motor revolution number 0-MRN1, region RGE2 for motor revolution number MRN1-MRN2 and region RGE3 for motor revolution number MRN of at least MRN2.

If the correlated output voltage Vac and motor revolution number MRN is included in region RGE1, the control mode of motor generator MG is the PWM control mode. If the correlated output voltage Vac and motor revolution number MRN is included in region RGE2, the control mode of motor generator MG is the overmodulation control mode. If the correlated output voltage Vac and motor revolution number MRN is included in region RGE3, the control mode of motor generator MG is the rectangular-wave control mode.

Motor control unit 36 uses an equation: Vac=Vm×k and varies voltage utilization factor k to 0.61, 0.75 and 0.78 for example to calculate output voltage Vac (Vac (0.61), Vac (0.75), Vac (0.78)). Voltage utilization factor k of 0.61 (k=0.61) is the voltage utilization factor when the control mode of motor generator MG is the PWM control mode. Voltage utilization factor k of 0.75 (k=0.75) is the voltage utilization factor when the control mode of motor generator MG is the overmodulation control mode. Voltage utilization factor k of 0.78 (k=0.78) is the voltage utilization factor when the control mode of motor generator MG is the rectangular-wave control mode. Then, motor control unit 36 determines which of the three calculated output voltages Vac is correlated with motor revolution number MRN in such a manner that is present on curve k1.

If the correlated output voltage Vac (0.61) and motor revolution number MRN is present on curve k1, namely the correlated output voltage Vac (0.61) and motor revolution number MRN is in region RGE1, motor control unit 36 determines that the control mode of motor generator MG is the PWM control mode. If the correlated output voltage Vac (0.75) and motor revolution number MRN is present on curve k1, namely the correlated output voltage Vac (0.75) and motor revolution number MRN is in region RGE2, motor control unit 36 determines that the control mode of motor generator MG is the overmodulation control mode. If the correlated output voltage Vac (0.78) and motor revolution number MRN is present on curve k1, namely the correlated output voltage Vac (0.78) and motor revolution number MRN is in region RGE3, motor control unit 36 determines that the control mode of motor generator MG is the rectangular-wave control mode.

Motor control unit 36 holds curve k1 as a map and refers to the map to determine the control mode of motor generator MG based on output voltage Vac and motor revolution number MRN.

Thus, when motor revolution number MRN of motor generator MG changes, motor control unit 36 determines the control mode of motor generator MG based on the above-described map.

Figure 6:
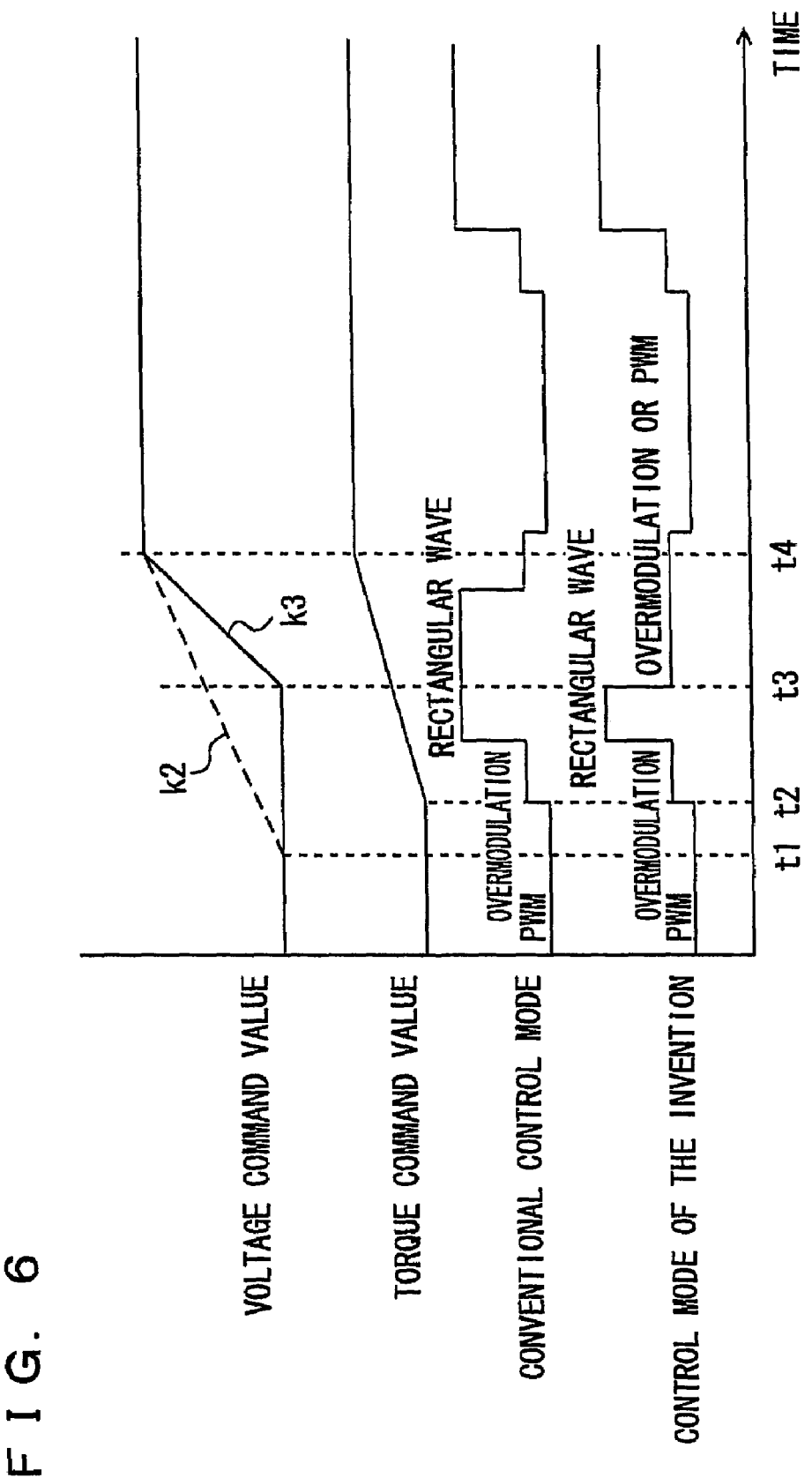
FIG. 6 is a timing chart of a voltage command value, a torque command value and a control mode.

FIG. 6 is a timing chart of voltage command value Vdc_com, torque command value TR and the control mode. Referring to FIG. 6, a description is given of an operation of load driver 100.

Before voltage step-up converter 11 performs the boosting operation, voltage command value Vdc_com is identical to DC voltage Vb and motor generator MG is driven in the PWM control mode. In order to reduce the amount of current taken from DC power supply B by decreasing the voltage utilization factor of motor generator MG, it would be an appropriate way to increase voltage command value Vdc_com along straight line k2 between timing t1 and timing t4. Actually, however, voltage command value Vdc_com is increased along straight line k3 between timing t3 and timing t4 in consideration of the efficiency.

In this case, torque command value TR increases linearly between timing t2 and timing t4. Further, the control mode of motor generator MG is switched with the passage of time from the PWM control mode, the overmodulation control mode and the rectangular-wave control mode in this order.

Then, at timing t3 at which motor generator MG is driven in the rectangular-wave control mode, voltage step-up converter 11 starts to do the boosting operation. In the rectangular-wave control mode, the current to be flown to motor generator MG is controlled in synchronization with the rising and falling of one pulse. Therefore, after the current to be flown to motor generator MG is controlled at the rising of one pulse, the current to be flown to motor generator MG cannot be controlled until the following falling of the pulse. Consequently, if motor generator MG is driven in the rectangular-wave control mode, the amount of current taken from DC power supply B increases. This tendency is conspicuous particularly when voltage step-up converter 11 is performing the boosting operation. Overcurrent thus could flow in load driver 100.

In order to avoid the-above described condition, the present invention drives motor generator MG, when voltage step-up converter 11 starts to do the boosting operation at timing t3 while motor generator MG is driven in the rectangular-wave control mode, by switching the control mode from the rectangular-wave control mode to the overmodulation or PWM control mode.

In the overmodulation control mode and the PWM control mode, the current to be flown to motor generator MG is controlled more frequently as compared with the rectangular-wave control mode. Therefore, according to the level of voltage supplied from voltage step-up converter 11, the amount of current to be flown to motor generator MG can be controlled. Accordingly, the amount of current taken from DC power supply B decreases and thus the overcurrent flowing in load driver 100 can be suppressed.

Preferably, the control mode is switched from the rectangular-wave control mode to the PWM control at timing t3. Accordingly, the amount of current taken from DC power supply B can further be decreased as compared with the case where the control mode is switched to the overmodulation control mode, and the overcurrent flowing in load driver 100 can further be suppressed.

Figure 7:
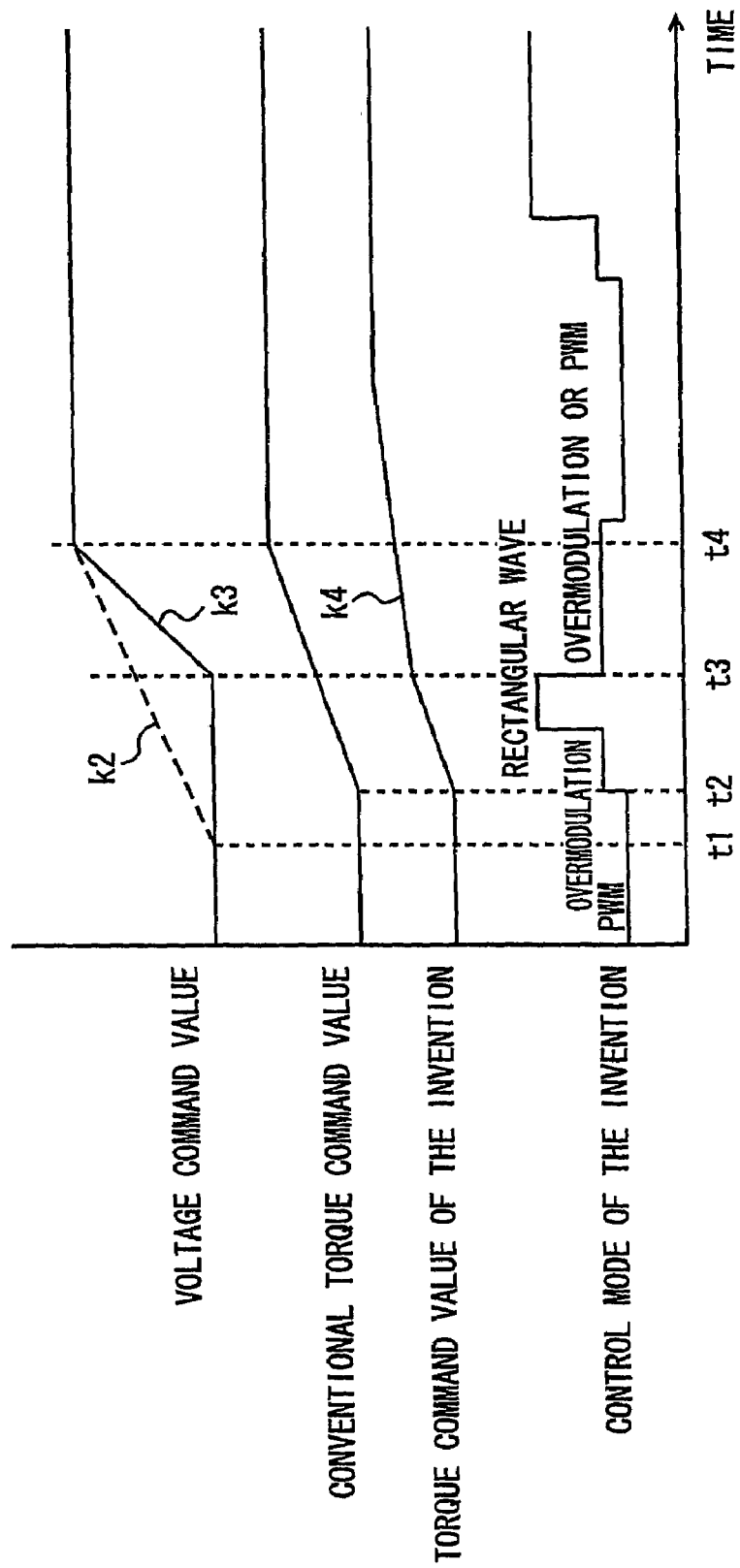
FIG. 7 is another timing chart of the voltage command value, torque command value and control mode.

FIG. 7 is another timing chart of voltage command value Vdc_com, torque command value TR and the control mode. Referring to FIG. 7, if voltage step-up converter 11 starts to perform the boosting operation at timing t3 at which motor generator MG is driven in the rectangular-wave control mode, the control mode of motor generator MG is switched to the overmodulation or PWM control mode and increase of torque command value TR is suppressed.

Specifically, at and after timing t3, upon receiving torque command value TR from the external ECU, voltage command calculation unit 33 of converter control means 302 calculates voltage command value Vdc_com by determining torque command value TR in such a manner that the rate of increase of torque command value TR is lower than that of torque command value TR before timing t3. In other words, at and after timing t3, voltage command calculation unit 33 determines torque command value TR so that torque command value TR increases along straight line k4 to calculate voltage command value Vdc_com.

Thus, at and after timing t3, motor generator MG is driven in the overmodulation or PWM control mode to output the torque command value TR with its increase suppressed.

Accordingly, the amount of current taken from DC power supply B is further reduced and the overcurrent flowing in load driver 100 can further be suppressed.

The timing at which increase of torque command value TR is suppressed may not be the same as the timing at which the control mode is switched from the rectangular-wave control mode to the overmodulation or PWM control mode.

Figure 8:
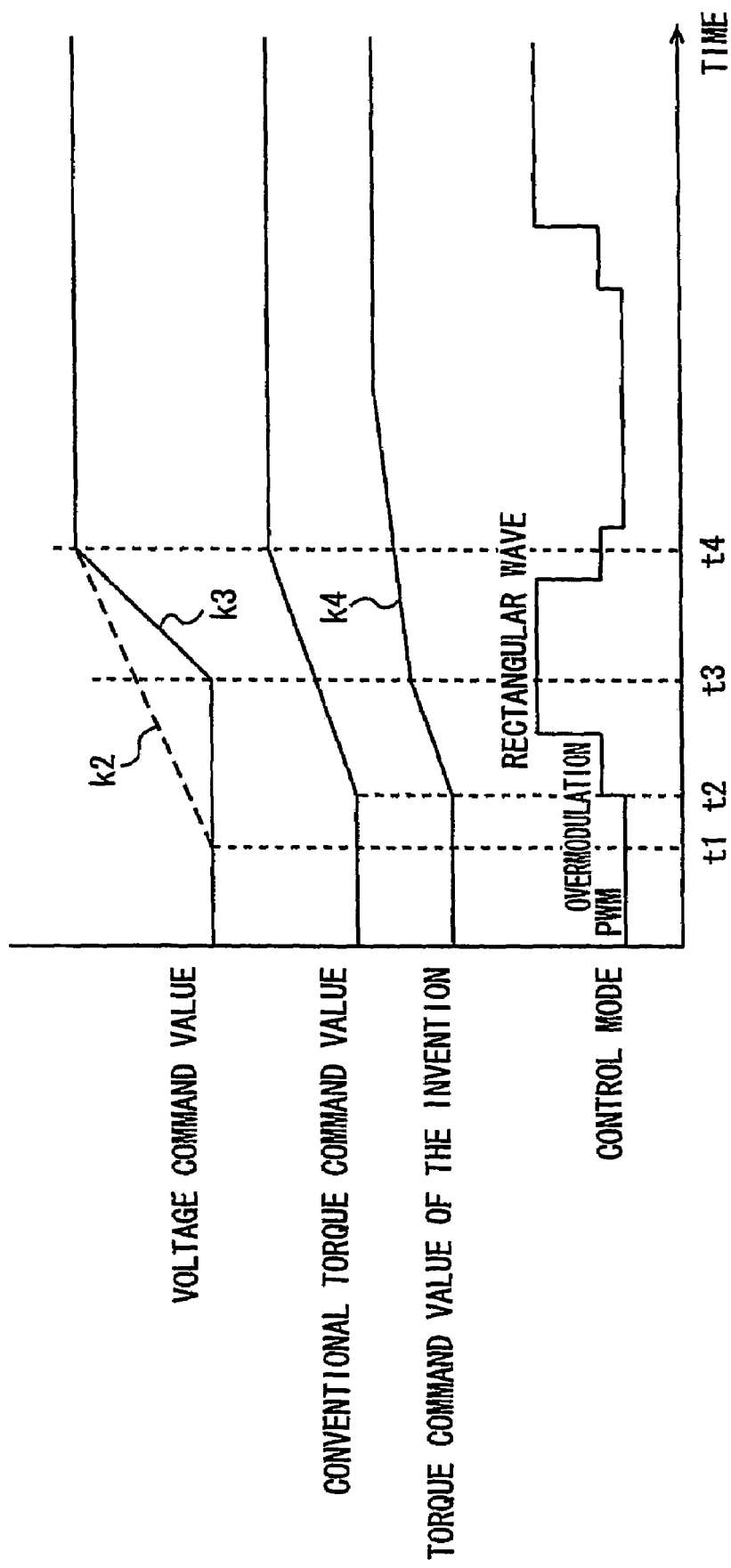
FIG. 8 is still another timing chart of the voltage command value, torque command value and control mode.

FIG. 8 is still another timing chart of the voltage command value, torque command value and control mode. Referring to FIG. 8, if voltage step-up converter 11 starts to perform the boosting operation at timing t3 at which motor generator MG is driven in the rectangular-wave control mode, increase of torque command value TR is suppressed.

Specifically, at and after timing t3, upon receiving torque command value TR from the external ECU, voltage command calculation unit 33 of converter control means 302 calculates voltage command value Vdc_com by determining torque command value TR in such a manner that torque command value TR increases along straight line k4.

In this case, the control mode of motor generator MG is not switched and the rectangular-wave control mode is maintained.

Thus, at and after timing t3, motor generator MG is driven in the rectangular-wave control mode so that it outputs torque command value TR with its increase suppressed.

The amount of current taken from DC power supply B is thus reduced and the overcurrent flowing in load driver 100 can be suppressed.

As discussed above, if the command to do the boosting operation by voltage step-up converter 11 is issued while the control mode of motor generator MG is the rectangular-wave control mode, control device 30 controls inverter 20 to drive motor generator MG by (A) switching the control mode of motor generator MG from the rectangular-wave control mode to the overmodulation or PWM control mode, (B) switching the control mode of motor generator MG from the rectangular-wave control mode to the overmodulation or PWM control mode and suppressing increase of torque command value TR, or (C) suppressing increase of torque command TR.

Further, if the command to do the boosting operation by voltage step-up converter 11 is issued while the control mode of motor generator MG is the PWM or overmodulation control mode, control device 30 inhibits the control mode of motor generator MG from being switched to the rectangular-wave control mode. Specifically, when the command to do the boosting operation by voltage step-up converter 11 is issued, control device 30 inhibits output of signal PWMI_K to inverter 20 and generates signal PWMI_P or PWMI_M to output the generated signal to inverter 20.

When voltage step-up converter 11 starts to do the boosting operation while the control mode of motor generator MG is the PWM control mode or overmodulation control mode, motor generator MG is thus inhibited from being driven in the rectangular-wave control mode for the following reason.

When the command to do the boosting operation by voltage step-up converter 11 is issued, control device 30 generates signal PWMU by the above-described method based on torque command value TR and motor revolution number MRN and outputs the generated signal to NPN transistors Q1 and Q2 of voltage step-up converter 11. Then, NPN transistors Q1 and Q2 carry out a switching operation according to signal PWMU from control device 30 and accordingly voltage step-up converter 11 starts to perform the boosting operation.

It is seen from the above that there is a certain delay in the period from the time when the command to do the boosting operation by voltage step-up converter 11 is issued to the time when voltage step-up converter 11 actually starts to do the boosting operation. Therefore, at the timing when voltage step-up converter 11 actually starts the boosting operation, it would be possible that the control mode of motor generator MG has been switched to the rectangular-wave control mode.

Then, when the command to do the boosting operation by voltage step-up converter 11 is issued, motor generator MG is inhibited from being driven in the rectangular-wave control mode.

It is noted that load driver 100 is mounted on a hybrid or electric vehicle to drive the drive wheels of the hybrid or electric vehicle.

If load driver 100 is mounted on the hybrid vehicle for example, motor generator MG is comprised of two motor generators MG1 and MG2. Motor generator MG1 is coupled to an engine via a power split device to start the engine, and generates electric power utilizing the rotational force of the engine. Motor generator MG2 is coupled to front (drive) wheels via the power split device to drive the front wheels, and generates electric power utilizing the rotational force of the front wheels.

If load driver 100 is mounted on the electric vehicle, motor generator MG is coupled to front (drive) wheels to drive the front wheels, and generates electric power utilizing the rotational force of the front wheels.

Then, control device 30 of load driver 100 determines the control mode of motor generator MG when the hybrid or electric vehicle is running and stopping. If the determined control mode of motor generator MG is the rectangular-wave control mode while the command to do the boosting operation by voltage step-up converter 11 is issued, control device 30 controls inverter 20 to drive motor generator MG by one of methods (A), (B) and (C) described above.

In this way, overcurrent flowing in load driver 100 mounted on the hybrid or electric vehicle can be suppressed.

Although it is described above that load driver 100 drives one motor generator MG, load driver 100 of the present invention may drive a plurality of motor generators. In this case, a plurality of inverters are provided correspondingly to the plurality of motor generators and the inverters are connected in parallel with the two terminals of capacitor 12. If at least one of the motor generators is driven in the rectangular-wave control mode while the command to perform the boosting operation by voltage step-up converter 11 is issued, control device 30 controls the plurality of inverters in such a manner that the plurality of motor generators are driven by one of methods (A), (B) and (C) described above.

In this way, overcurrent flowing in the load driver driving the motor generators can be suppressed.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applied to a load driver capable of suppressing overcurrent.

The invention claimed is:

1. A load driver comprising:
an inverter driving a load;
a voltage converter executing voltage conversion between a power supply and said inverter; and
a control device controlling said inverter to drive said load by changing control mode of said load from a rectangular-wave control mode to one of a pulse-width-modulation control mode and an overmodulation control mode, upon receiving a command to perform a boosting operation by said voltage converter when the control mode of said load is said rectangular-wave control mode.

2. The load driver according to claim 1, wherein
said control device controls said inverter to drive said load by changing said control mode to said pulse-width-modulation control mode.

3. The load driver according to claim 1, wherein
said control device controls said inverter to drive said load by further suppressing increase of a torque command value.

4. The load driver according to claim 2, wherein
said control device controls said inverter to drive said load by further suppressing increase of a torque command value.

5. A load driver comprising:
an inverter driving a load;
a voltage converter executing voltage conversion between a power supply and said inverter; and
a control device controlling said inverter to drive said load by suppressing increase of a torque command value, upon receiving a command to perform a boosting operation by said voltage converter when control mode of said load is a rectangular-wave control mode.

6. A load driver comprising:
an inverter driving a load;
a voltage converter executing voltage conversion between a power supply and said inverter; and
a control device controlling said inverter to drive said load in one of a pulse-widgth-modulation control mode and an overmodulation control mode when said voltage converter performs a boosting operation.

* * * * *